Jan. 9, 1962   H. RUSTEMEYER ET AL   3,015,862
COMPOSITE MOLD
Filed Feb. 26, 1958   2 Sheets-Sheet 1
FIG. 1
FIG. 3
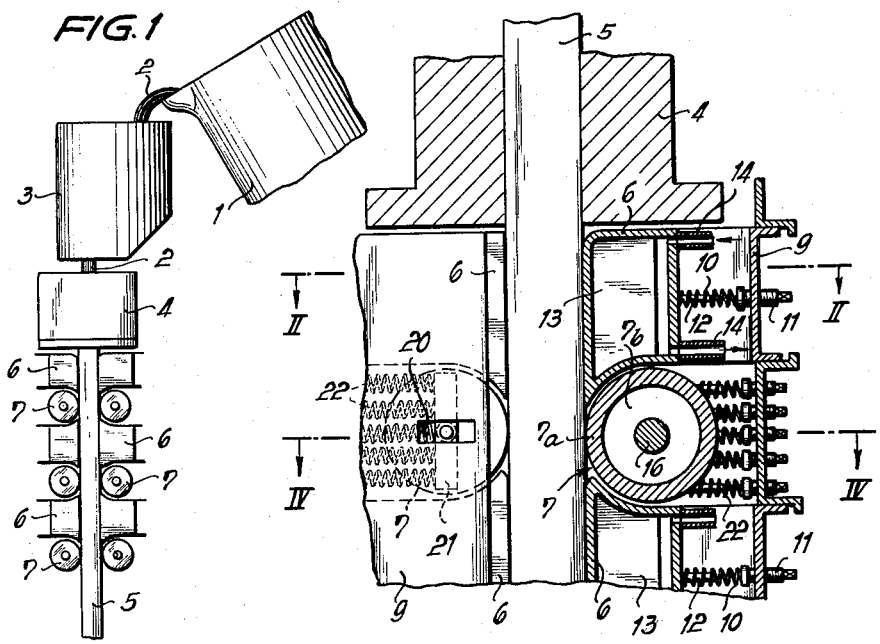
FIG. 2
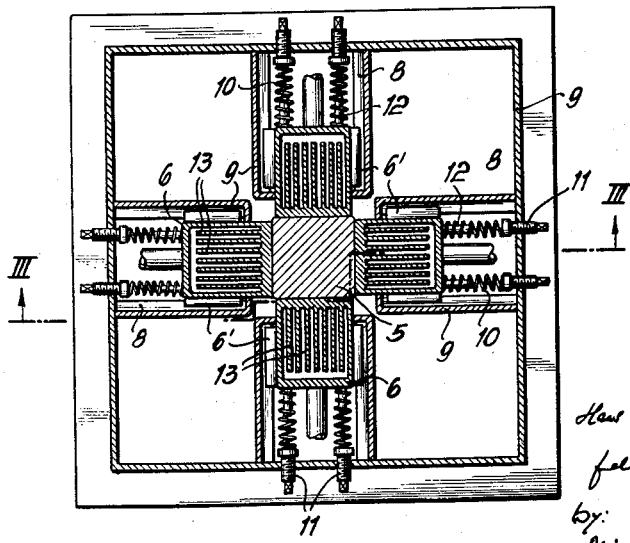
INVENTORS
Hans Rustemeyer
and
Felix Pollmeier
by: Michael S. Striker
Attorney

3,015,862
COMPOSITE MOLD
Hans Rustemeyer, Liebigstr. 1, and Felix Pollmeier, Bagelstr. 100, Dusseldorf, Germany
Filed Feb. 26, 1958, Ser. No. 717,757
11 Claims. (Cl. 22—57.2)

The present invention relates to coquilles or mold for continuously extruded castings, and more particularly to a composite coquille for such types of products.

An important object of the invention is to provide a composite coquille comprising means so disposed in the path of the extruded product as to simultaneously chill all surfaces of same.

A concomitant object of the invention is to provide an assembly of the above character which is so arranged that the extruded product is subjected to varying transverse pressures as it travels through the composite coquille.

A further object of the invention is to provide a coquille so constructed and so assembled in the path of the advancing casting as to simultaneously chill and maintain the contours of the extruded product.

Another object of the invention is to provide an assembly of the above character which is capable of simultaneously chilling and shaping all sides of a casting of polygonal cross-sectional contour.

An additional object of the invention is to provide a composite coquille comprising yieldably mounted means under constant and variable pressure so disposed in the path of the advancing extruded product as to maintain and/or restore the contours of the casting.

A still further object of the invention is to provide a composite coquille consisting of a rigid mold and a number of yieldably mounted pressing means having alternating surface- and line-contact with the advancing casting which, acting against all surfaces of the product, prevent the penetration of liquid core if the casting is only partly hardened, and also contribute to rapid and uniform chilling of its surfaces.

Another important object of the invention is to provide an assembly of the above-described character which operates in such a way as to restore the shape of the advancing casting if, due to rapid chilling in the preceding zone of the composite chill, the extruded product was deformed while advancing therethrough.

A more specific object of the invention is to provide a composite coquille so constructed that its pressure against all sides of the advancing casting may be controlled within a wide range.

A yet further object of the invention is to provide a composite chill which is of relatively simple construction and whose parts may be conveniently interchanged, repaired or replaced, if necessary.

The novel coquille consists essentially of a rigidly mounted, chilled, casting mold having a shaping passage which receives the liquid stock, and of an adjacent assembly of alternately arranged pressing pads and pressure or cooling rollers yieldably mounted in such a way as to exert a controlled pressure of varying magnitude against the advancing casting. The pads and the rollers form a second passage to preferably fully encase the advancing extruded product and, being cooled in any suitable manner, contribute to rapid chilling of the casting. The chilling is even more rapidly advanced due to full surface contact of each pad with the adjacent surface of the casting. If, due to rapid chilling during its travel through the first group or groups of alternating pads and rollers, the casting should become deformed to any appreciable extent, subsequently arranged pads and rollers restore the original shape of the advancing product. It is preferred to subject the rollers to substantially greater pressures than the alternately disposed pressing pads, whereby the rollers restore the original shape of the casting which latter is again in full surface-to-surface contact with the next following group of pads to thus speed up the chilling of the advancing product. Each pad and each roller is slidably mounted in the casing of the composite coquille in such a manner as to be movable in directions transverse to the direction of movement of the casting and at right angles to the adjacent surfaces thereof.

Depending upon the shape of the extruded product, more than one pad may be provided along the larger surfaces of the casting and, if desired, the pressure of pads and of rollers against the casting may be adjusted within a wide range.

Suitable means may be provided for rotating the rollers in such a way that the rollers maintain freedom of movement in directions transverse to the direction of movement of the casting which is advanced by the rotating rollers.

Other features, advantages and attributes of the invention will become apparent in the course of the following detailed description of two embodiments selected for illustration in the accompanying drawings wherein FIG. 1 is a schematic elevational view of one form of a composite coquille for continuous casting;

FIG. 2 is an enlarged section taken in a horizontal plane through the assembly of FIG. 1, as seen from line 2—2 in FIG. 3;

FIG. 3 is a vertical section taken on line 3—3 of FIG. 2;

Figure 4:
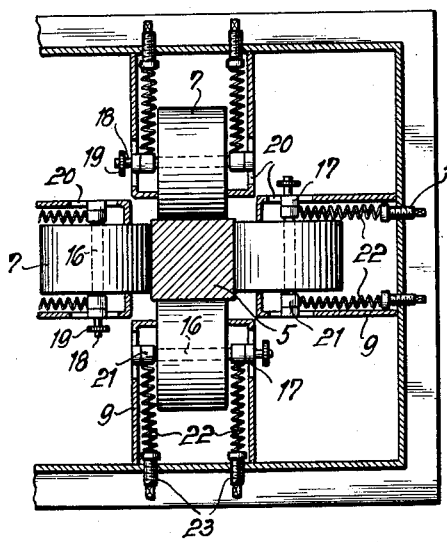
FIG. 4 is a horizontal section taken on line 4—4 of FIG. 3.

Referring now in greater detail to the embodiment of FIGS. 1 through 4 and first to FIG. 1, liquid stock 2 is poured from a casting ladle 1 into the surge tank 3 whence it flows into the vertical shaping passage in the chilled casting mold 4 which constitutes the rigid half of the novel coquille. Upon leaving the chilled mold 4, casting 5 passes through the other half of the coquille toward the customary separator means which is not illustrated. This second half of the improved coquille comprises a number of pressure or cooling pads or shoes 6 adjacent to all sides of casting 5 which alternate with layers or groups of pressure rollers 7. Pads 6 and rollers 7 alternate in vertical rows longitudinally of and adjacent to each side of the casting.

FIG. 2 illustrates four pressure pads 6 in contact with the four surfaces of casting 5 which is of square cross-sectional contour. Each member 6 is provided with ribs 6' received in and guided by channels 8 in the coquille frame 9 to permit displacement of pressure pads in a direction transverse to the direction of movement of the extruded product and at right angles to its surfaces. Coil springs 10, acting between frame 9 and each pressure pad 6, permanently urge the latter in a direction toward the adjacent surface of the casting. One end of each resilient member is mounted on a pin 12 projecting from the pressure pad 6, and its other end abuts against a regulating screw 11 mounted in the coquille frame 9. Thus, the pressure of springs 10, and consequently the pressure of pads 6 against the advancing casting may be adjusted by rotation of members 11.

The interior of each pad 6 is formed with a number of radiating vanes 13 which are cooled by a liquid medium communicating through channels 14 (see FIG. 3).

A pressure roller 7 is provided between each vertically aligned pair of pads 6. The axial length of each roller substantially equals the width of pressure pads 6 as well as the width of casting 5 which latter is thus fully enclosed by elements 6 and 7 (see FIGS. 2 and 4). Each roller comprises a cylindrical portion 7a and a pair of end walls 7b axially traversed by and fixed to a horizontal shaft 16 whose ends are rotatably received in a rectangular slide 17. One end of each shaft 16 projects through the adjacent slide to form an extension 18 with a sprocket 19 rigidly fixed thereto. The latter may be driven in any suitable manner, for example, by an endless chain or the like. Each slide 17 is received in a slot 20 provided in the coquille frame 9 and carries transverse extensions 21 to serve as abutments for an end of each of a series of coil springs 22 whose other ends bear against adjustable screws 23 mounted in the coquille frame. As best shown in FIG. 2, each pad 6 is urged into contact with the surface of casting 5 by a pair of coil springs 10 while the rollers (see FIGS. 3 and 4) are pressed against the casting by two rows of springs 22, ten in number in the illustrated example, to exert a substantially greater pressure against the casing. Moreover, as the rollers 7 have a mere linear, i.e. tangential contact with the extruded product in contrast to the full surface-to-surface contact between member 5 and each pressure pad or shoe 6, the specific surface pressure of each roller greatly exceeds the pressure of a pad 6.

When the assembly is put to use, the hot casting 5 slides, upon passing through the channel in the rigid mold 4, in the passage defined by members 6 and 7 and first along the uppermost group of cooled pads 6 and is thus chilled while in contact with the latter. If the casting is deformed to such an extent that its surfaces would be in only partial contact with the pressure-exerting surfaces of a next following group of pads 6, the first set of rollers 7, by pressing against all sides of the extruded product (see FIG. 4), restores its surfaces so as to bring about a full contact with the next following group of pads 6. Rollers 7 can so shape the extruded product due to substantial pressure to which they are subjected by springs 22 and also due to mere linear contact with the casting 5. The number and the pressure of springs 22 is so selected that the rollers 7 may change the shape of the casting without, however, destroying same. Rollers 7 may be cooled in any convenient manner.

Figure 5:
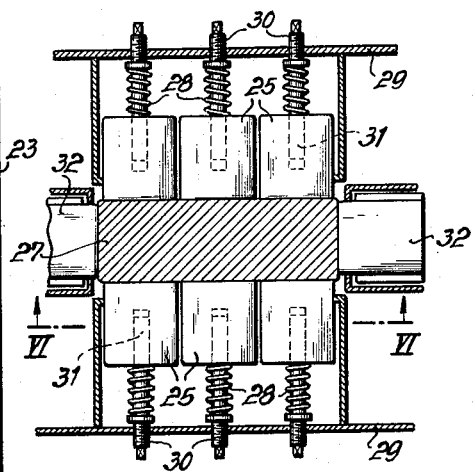
FIG. 5 illustrates a modified coquille in horizontal section, the section being taken on line 5—5 of FIG. 6.
Figure 6:
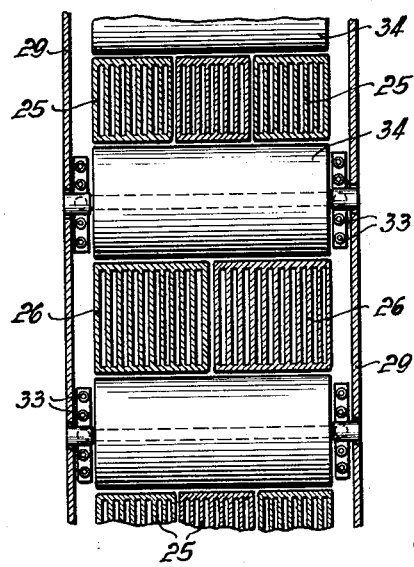
FIG. 6 is a vertical section taken on line 6—6 of FIG. 5.

FIGS. 5 and 6 illustrate an arrangement of pads 25, 26 and pressure rollers 34 for a casting 27 of rectangular contour whose width substantially exceeds its thickness. Springs 28, urging the pads or shoes 25, 26 against the casting, are mounted on bolts 30 supported in the coquille frame 29, the cylindrical ends 31 of these bolts extending into aligned bores in the pressing pads. As shown in FIG. 5, the springs act between a collar on each bolt 30 and the adjacent surface of a pressing pad 25 or 26. Pads 32 adjacent to the narrower end faces of casting 27 may be resiliently mounted either in a manner as shown in connection with members 25 in FIG. 5, or as illustrated in FIGS. 2 and 3 for members 6.

It will be noted in FIG. 6 that relatively narrow pads 25 alternate with pads 26 of greater width, and that the meeting faces of adjacent pads 25 are not aligned with the meeting faces between members 26 so as to prevent any ridges or other irregular formations at such points of the advancing casting 27. The width of each pad, in this embodiment, corresponds to one-third of the largest cross-sectional dimension of casting 27. On the other hand, combined width of two pads 26 equals the combined width of three members 25.

Shaping rollers 34 between pads 25 and 26 are under constant pressure by a number of springs 33 to urge members 34 against the adjacent surfaces of the advancing casting. Additional rollers, for example, such as members 7 shown in FIGS. 3 and 4, are provided between vertically aligned pads 32 adjacent to the narrower end faces of the casting.

A similar composite coquille, with very small modifications, may be employed for extrusion of castings of different, for example, triangular or hexagonal cross-sectional contour.

Since it is obvious that a great number of other changes and modifications can be made in the above-described details without departing from the nature and spirit of the invention, it is to be understood that the invention should not be limited to the details described herein except as set forth in the appended claims.

What we claim and desire to protect by Letters Patent is:

1. A composite mold for continuous casting, comprising, in combination, rigid molding means defining an elongated passage of polygonal cross-sectional contour and having an inlet end and an exit end; means adjacent to said exit end of said passage for defining a second elongated passage aligned with said first mentioned passage, said last mentioned means comprising a plurality of cooling means disposed in a plurality of rows extending longitudinally of said second passage with the number of rows corresponding to the number of sides of the cross-sectional contour of said passages; each of said cooling means having an inner surface extending in longitudinal direction and in line with one of the sides of the cross-sectional contour of said passages; means for constantly urging each of said cooling means toward said second passage; pressure roller means disposed between each pair of longitudinally aligned cooling means; a shaft for each of and rotatably mounting said pressure roller means; and resilient means for constantly urging said pressure roller means in substantially transverse directions toward said second passage in such a manner that said pressure roller means are pressed with a greater specific surface pressure against a casting passing through said second passage than said cooling means, whereby a casting, in passing from said first mentioned through said second passage will be held in continuous contact with said inner surfaces of said cooling means and with a peripheral zone of each of said roller means.

2. A composite mold for continuous casting, comprising, in combination, rigid molding means defining a substantially vertical passage of polygonal cross-sectional contour and having an upper end and a lower end; means adjacent to said lower end of said passage for defining a second passage aligned with said first mentioned passage, said last mentioned means comprising a plurality of cooling means disposed in a plurality of vertical rows with the number of rows corresponding to the number of sides of the cross-sectional contour of said passages, each of said cooling means having an inner surface extending in longitudinal direction and in line with one of the sides of the cross-sectional contour of said passages; means for individually and constantly urging said cooling means in substantially horizontal directions toward said second passage; pressure roller means disposed between each pair of vertically aligned cooling means; a horizontal shaft for each of and rotatably mounting said pressure roller means; resilient means for constantly urging said pressure roller means toward said second passage in substantially horizontal directions in such a way that said pressure roller means are pressed with a greater specific surface pressure against a casting passing through said second passage than said cooling means, whereby a casting, descending from said first mentioned passage and through said last mentioned passage will be held in continuous contact with said inner surfaces of said cooling means and with a peripheral zone of each of said roller means; and means for cooling said rigid molding means, said cooling means and said pressure roller means.

3. A composite mold for continuously extruding an elongated casting of polygonal cross-sectional contour, comprising, in combination, rigid molding means defining a shaping passage for the casting with an inlet end and an exit end; a frame; cooling means and pressing means in said frame adjacent to said exit end of said passage and defining a second passage aligned with said first mentioned passage, said cooling means comprising a plurality of hollow cooling members adapted to be filled with a cooling fluid and each having a substantially plane surface adjacent to said second passage and at least one curved surface extending in transverse direction of said plane surface, said cooling members being disposed in surrounding relationship at longitudinally spaced intervals adjacent to said second passage to form a plurality of spaced groups with said plane surfaces of adjacent groups separated from each other and said curved surfaces facing each other and forming a gap increasing in direction away from said plane surfaces, each group comprising a plurality of cooling members, at least one for each side of the cross-sectional contour of said second passage, said pressing means comprising a plurality of spaced groups of pressing rollers alternating with said groups of cooling members and respectively located in said gaps, each roller having a cylindrical surface in tangential contact with the adjacent side of the casting passing through said second passage and closely spaced from the curved surfaces of the adjacent cooling members; means for guiding said cooling members and said pressing rollers in said frame transversely of said second passage; first resilient means for constantly urging each of said cooling members in a direction toward said second passage; means for controlling the pressure of said first resilient means; second resilient means for constantly urging each of said pressing rollers in a direction toward said second passage; and means for controlling the pressure of said second resilient means.

4. A composite mold for continuously forming an elongated casting of polygonal cross-sectional contour, comprising, in combination, rigid molding means defining a shaping passage for the casting and having an inlet end and an exit end; a frame; cooling means and pressing means in said frame adjacent to said exit end of said passage and defining a second passage similar to and aligned with said first mentioned passage, said cooling means comprising a plurality of hollow cooling members each having a substantially plane surface adjacent to said second passage and a plurality of cooling ribs extending from said plane surface into the interior of said hollow cooling member, said cooling members being disposed in groups spaced longitudinally of and in surrounding relationship with respect to said second passage with each group comprising at least one cooling member for each side of the casting, said pressing means comprising a plurality of pressing rollers disposed in spaced groups alternating with said groups of said cooling members, each roller having a cylindrical surface in tangential contact with the adjacent surface of the casting passing through said second passage and a shaft rotatably supported in said frame and parallel with the adjacent side of the casting passing through said second passage, each shaft having an axis transverse to the longitudinal direction of said second passage; means for guiding a cooling fluid into and out from said hollow cooling members; means in said frame for guiding each of said shafts and each of said cooling members in directions transversely of the longitudinal direction of said second passage; and resilient means for constantly urging each of said cooling members and each of said rollers toward said second passage.

5. A composite mold for continuously forming an elongated casting of rectangular cross-sectional contour, comprising, in combination, rigid molding means defining a rectangular passage for the casting and having an inlet end and an exit end; a frame; cooling means and pressing means in said frame adjacent to said exit end of said passage and defining a second rectangular passage aligned with said first mentioned passage said cooling means comprising a plurality of cooling members each having a substantially plane surface adjacent to one side of said second passage, said cooling members being disposed in spaced groups longitudinally of and in surrounding relationship with respect to said second passage with each group comprising one cooling member for each side of the second passage said pressing means comprising a plurality of pressing rollers disposed in spaced groups alternating with said groups of said cooling members, each group of said pressing rollers comprising four rollers each adjacent to one side of said second passage, each roller having a cylindrical surface in tangential contact with the adjacent surface of the casting passing through said second passage and a shaft rotatably supported in said frame and parallel with the adjacent side of said second passage, each shaft having an axis transverse to the longitudinal direction of said second passage; means in said frame for guiding each of said shafts and each of said cooling members in directions transversely of the longitudinal direction of said second passage; resilient means for constantly urging each of said cooling members and each of said rollers toward said second passage; and means for cooling said molding means, said cooling members and said pressing rollers.

6. A composite mold for continuously forming an elongated casting of rectangular cross-sectional contour, comprising, in combination, rigid molding means defining a rectangular passage for the casting and having an inlet end and an exit end; a frame; cooling means and pressing means in said frame adjacent to said exit end of said passage and defining a second rectangular passage aligned with said first mentioned passage said cooling means comprising a plurality of cooling members each having a substantially plane surface adjacent to said second passage, said cooling members being disposed in spaced groups longitudinally of and in surrounding relationship with respect to said second passage with each group comprising more than one cooling member for at least one side of said second passage with the cooling members of adjacent groups and adjacent to the same side of said second passage in staggered relationship said pressing means comprising a plurality of pressing rollers disposed in spaced groups alternating with said groups of said cooling members, each roller having a cylindrical surface in tangential contact with the adjacent surface of the casting passing through said second passage and a shaft rotatably supported in said frame and parallel with the adjacent side of the casting passing through said second passage, each shaft having an axis transverse to the longitudinal direction of said second passage; means in said frame for guiding each of said shafts and each of said cooling members in directions transversely of the longitudinal direction of said second passage; first resilient means for constantly urging each of said cooling members toward said second passage; second resilient means for constantly urging each of said rollers toward said second passage; and means for cooling said molding means, said cooling members and said rollers.

7. A composite mold for continuously forming an elongated casting of polygonal cross-sectional contour, comprising, in combination, rigid molding means defining a shaping passage for the casting and having an inlet end and an exit end; a frame; cooling means and pressing means in said frame adjacent to said exit end of said passage and defining a second passage similar to and aligned with said first mentioned passage said cooling means comprising a plurality of cooling members each having a substantially plane surface adjacent to said second passage, said cooling members being disposed in spaced groups longitudinally of and in surrounding relationship with respect to said second passage with each group comprising at least one cooling member for each side of the casting, the width of said cooling members in selected ones of said groups being different from the width of cooling members in the others of said groups said pressing means comprising a plurality of pressing rollers disposed in spaced groups alternating with said groups of said cooling members, each roller having a cylindrical surface in tangential contact with the adjacent surface of the casting passing through said second passage and a shaft rotatably supported in said frame and parallel with the adjacent side of the casting passing through said second passage, each shaft having an axis transverse to the longitudinal direction of said second passage; means for rotating said shafts; means in said frame for guiding each of said shafts and each of said cooling members in directions transversely of the longitudinal direction of said second passage; first resilient means for constantly urging each of said cooling members toward said second passage; second resilient means for constantly urging each of said rollers toward said second passage with a force greater than the force of said first resilient means; and means for adjusting the tension of said first and said second resilient means.

8. A composite mold for continuously extruding and chilling an elongated casting of polygonal cross-sectional contour, comprising, in combination, rigid molding means defining a vertical shaping passage for the casting and having an inlet end and an exit end; a frame; cooling means and pressing means in said frame adjacent to said exit end of said passage and defining a second vertical passage similar to and aligned with said first mentioned passages; said cooling means comprising a plurality of cooling members each having a substantially plane surface of rectangular contour adjacent to said second passage, said cooling members being disposed in spaced horizontally aligned groups longitudinally of and in surrounding relationship with respect to said second passage with each group comprising at least one cooling member for each side of the casting said pressing means comprising a plurality of pressing rollers disposed in spaced horizontally aligned groups alternating said groups of said pressing members, each roller having a cylindrical surface in horizontal tangential contact with the adjacent surface of the casting passing through said second passage and a shaft rotatably supported in said frame and parallel with the adjacent side of the casting passing through said second passage, each shaft having a horizontal axis; means in said frame for guiding each of said shafts and each of said cooling members in directions transversely of the longitudinal direction of said second passage; resilient means acting between said frame and each of said cooling members and said rollers for constantly urging the latter toward said second passage; means for adjusting the tension of said resilient means; means for rotating each of said rollers in such directions as to advance the casting passing through said second passage in downward direction; and means for cooling said rigid molding means, said cooling members and said rollers.

9. A composite mold for continuous casting, comprising, in combination, rigid molding means defining an elongated passage of polygonal cross-sectional contour and having an inlet end and an exit end; means adjacent to said exit end of said passage for defining a second elongated passage aligned with said first mentioned passage, said last mentioned means comprising a plurality of cooling means disposed in a plurality of rows extending longitudinally of said second passage with the number of rows corresponding to the number of sides of the cross-sectional contour of said passages, each of said cooling means having an inner surface in line with one of the sides of the cross-sectional contour of said passages; means for constantly urging each of said cooling means toward said second passage; roller means disposed between each pair of longitudinally aligned cooling means; a shaft for each of and rotatably mounting said roller means; a sprocket on each of said shafts; means for driving each of said sprockets; and resilient means for constantly urging said roller means in substantially transverse directions toward said second passage in such a manner that a casting, in passing from said first mentioned through said second passage is in continuous contact with said inner surfaces of said cooling means and with a peripheral zone of each of said roller means.

10. A composite mold for continuous casting, comprising, in combination, rigid molding means defining an elongated passage of polygonal cross-sectional contour and having an inlet end and an exit end; a frame, means in said frame adjacent to said exit end of said passage for defining a second elongated passage aligned with said first mentioned passage, said last mentioned means comprising a plurality of cooling means disposed in a plurality of rows extending longitudinally of said second passage with the number of rows corresponding to the number of sides of the cross-sectional contour of said passages, each of said cooling means having an inner surface in line with one of the sides of the cross-sectional contour of said passages; resilient means for constantly urging each of said cooling means toward said second passage; roller means disposed between each pair of longitudinally aligned cooling means; a shaft for each of and rotatably mounting each of said roller means in said frame; and resilient means for constantly urging said roller means in substantially transverse directions toward said second passage with a force greater than the force of said first mentioned resilient means.

11. A composite mold for continuous casting, comprising, in combination, rigid molding means defining an elongated passage of polygonal cross-sectional contour and having an inlet end and an exit end; means adjacent to said exit end of said passage for defining a second elongated passage aligned with said first mentioned passage, said last mentioned means comprising a plurality of cooling means disposed in a plurality of rows extending longitudinally of said second passage with the number of rows corresponding to the number of sides of the cross-sectional contour of said passages, each of said cooling means having an inner surface in line with one of the sides of the cross-sectional contour of said passages; means for constantly urging each of said cooling means toward said second passage; roller means disposed between each pair of longitudinally aligned cooling means; a shaft for each of and rotatably mounting said roller means; resilient means for constantly urging said roller means in substantially transverse directions toward said second passage whereby a casting passing from said first mentioned through said second passage is in continuous contact with said inner surfaces of said cooling means and with a peripheral zone of each of said roller means, each of said cooling means and each of said roller means defining an enclosed chamber therewith; and means for circulating a coolant in said chambers.

References Cited in the file of this patent

UNITED STATES PATENTS

| 2,284,503 | Williams | May 26, 1942 |
| 2,770,021 | Harter et al. | Nov. 13, 1956 |

FOREIGN PATENTS

| 762,513 | Great Britain | Nov. 28, 1956 |